United States Patent [19]

Miyoshi et al.

[11] Patent Number: 4,601,357
[45] Date of Patent: Jul. 22, 1986

[54] FOUR-WHEEL STEERING SYSTEM FOR VEHICLE

[75] Inventors: Akihiko Miyoshi; Shigeki Furutani, both of Hiroshima; Isamu Chikuma; Satoru Shimada, both of Gumma, all of Japan

[73] Assignees: Mazada Motor Corp., Hiroshima; Nippon Seiko Kaisha, Tokyo, both of Japan

[21] Appl. No.: 714,530

[22] Filed: Mar. 21, 1985

[30] Foreign Application Priority Data

Mar. 26, 1984 [JP] Japan ................................ 59-56180

[51] Int. Cl.$^4$ ............................................. B62D 5/00
[52] U.S. Cl. .................................... 180/140; 180/141; 280/91
[58] Field of Search ............... 180/140, 141, 142, 143, 180/234, 240, 79; 280/291

[56] References Cited

U.S. PATENT DOCUMENTS

| 4,105,086 | 8/1978 | Ishii | 180/79 |
| 4,175,638 | 11/1979 | Christensen | 180/140 |
| 4,313,514 | 3/1982 | Furukawa et al. | 180/143 |
| 4,552,239 | 11/1985 | Kanazawa | 180/140 |

FOREIGN PATENT DOCUMENTS 0081270  5/1984  Japan .................................... 180/79

Primary Examiner—John J. Love
Assistant Examiner—Mark C. Dukes
Attorney, Agent, or Firm—Gerald J. Ferguson, Jr.; James E. Bryan; Michael P. Hoffman

[57] ABSTRACT

A four-wheel steering system for a vehicle has a rear wheel steering ratio changing means which changes the rear wheel steering ratio in accordance with rear wheel steering ratio characteristics predetermined according to the vehicle speed, and an inhibiting means which inhibits the rear wheel steering ratio changing means from changing the rear wheel steering ratio when the steering wheel is turned right or left from its neutral position.

17 Claims, 10 Drawing Figures

F I G.1
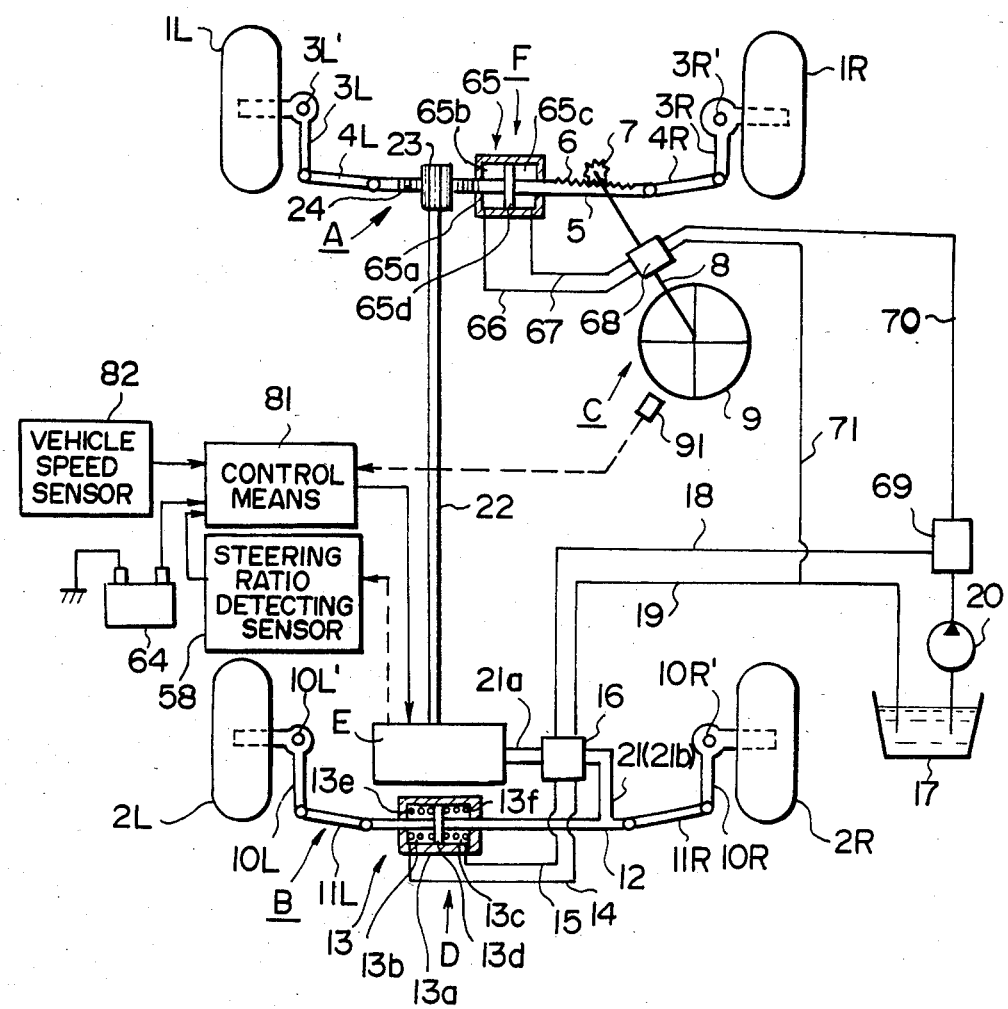

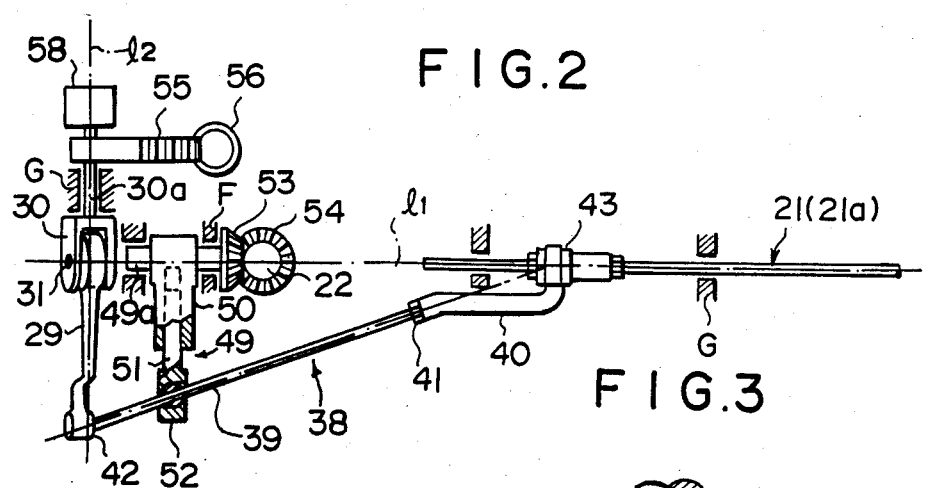
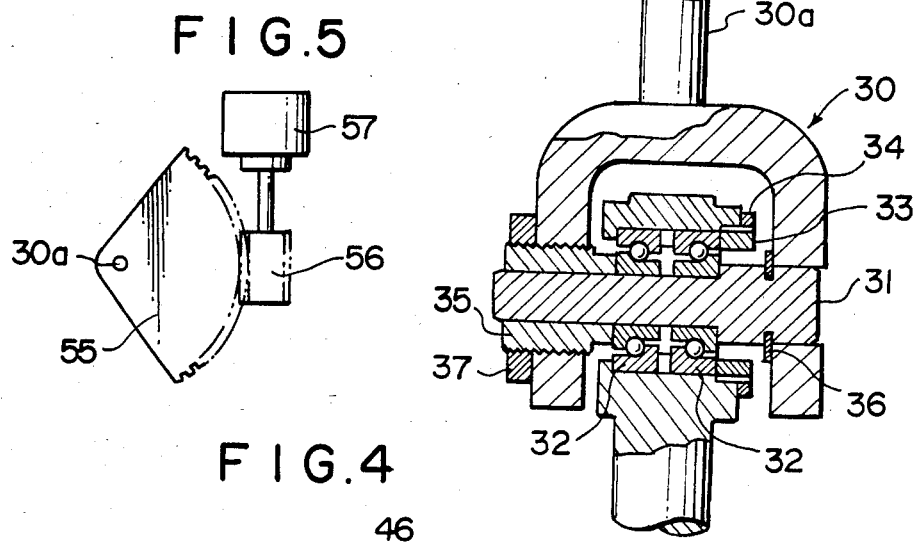
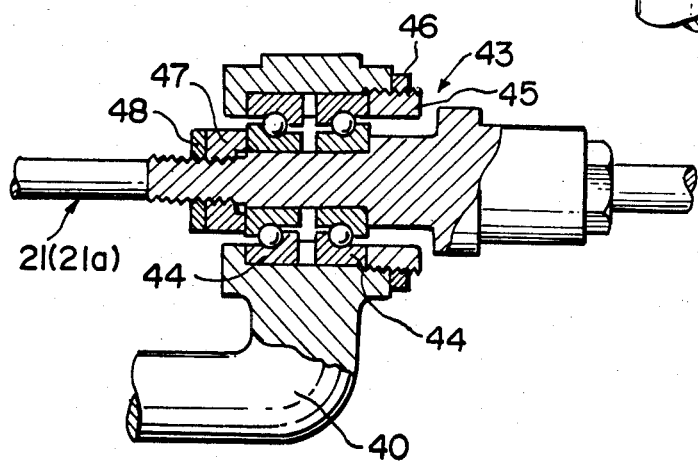

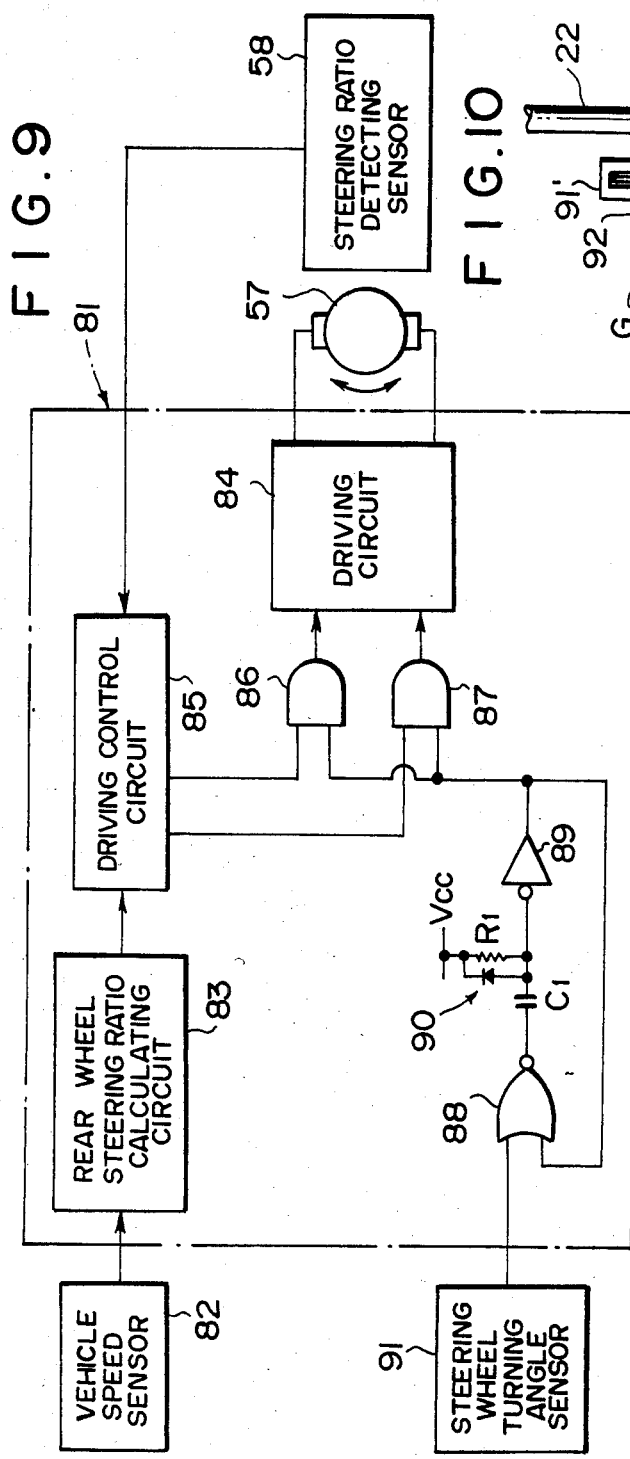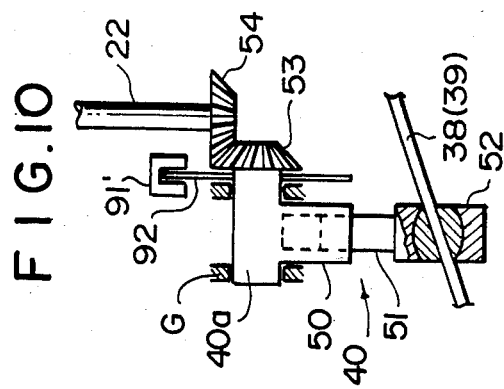

FOUR-WHEEL STEERING SYSTEM FOR VEHICLE

BACKGROUND OF THE INVENTION

1. Field of the Invention

This invention relates to a four-wheel steering system for a vehicle in which both the front wheels and the rear wheels are turned in response to operation of the steering wheel.

2. Description of the Prior Art

In U.S. Pat. No. 4,313,514, there is disclosed a four-wheel steering system in which the turning angle of the rear wheels for a given turning angle of the steering wheel or the ratio of the turning angle of the rear wheels to the turning angle of the steering wheel (hereinbelow referred to as "rear wheel steering ratio") is changed in accordance with the rear wheel steering ratio characteristics which are predetermined according to the operating conditions of the vehicle such as the vehicle speed.

However, it has been found that when operating conditions pertaining to the rear wheel steering ratio characteristics are changed and the rear wheel steering ratio is changed while the steering wheel is turned right or left, the behavior of the vehicle can be adversely affected. For example, assuming that the rear wheel steering ratio characteristics are so set that the rear wheels are turned in the same direction as the front wheels and the ratio of the turning angle of the rear wheels to the turning angle of the front wheels is increased as the vehicle speed increases, it can occur that the ratio of the turning angle of the rear wheels to that of the front wheels is reduced and the vehicle makes a sharper turn for a given turning angle of the steering wheel if the vehicle speed is reduced while the steering wheel is turned right or left. Such undesirable behavior of the vehicle also can occur if the rear wheel steering ratio characteristics are related to factors other than vehicle speed.

SUMMARY OF THE INVENTION

In view of the foregoing observations and description, the primary object of the present invention is to provide an improved four-wheel steering system in which undesirable behavior of the vehicle due to change in the rear wheel steering ratio during operation of the steering wheel can be prevented.

The four-wheel steering system for a vehicle in accordance with the present invention has a rear wheel steering ratio changing means which changes the rear wheel steering ratio in accordance with rear wheel steering ratio characteristics predetermined according to the vehicle speed and an inhibiting means which inhibits the rear wheel steering ratio changing means from changing the rear wheel steering ratio when the steering wheel is turned right or left from its neutral position.

That is, in the four-wheel steering system of the present invention, change of the rear wheel steering ratio is permitted only when the steering wheel is in the neutral position and is not permitted when the steering wheel is turned right or left from the neutral position taking into account that undesirable behavior of the vehicle body occurs when the rear wheel steering ratio is changed while the steering wheel is turned right or left.

BRIEF DESCRIPTION OF THE DRAWINGS

FIG. 1 is a schematic view showing a four-wheel steering system in accordance with an embodiment of the present invention, FIG. 2 is an enlarged schematic view illustrating an example of the steering ratio changing mechanism employed in the four-wheel steering system of the embodiment, FIGS. 3 and 4 are enlarged cross-sectional views of a part of the steering ratio changing mechanism of FIG. 2, FIG. 5 is an enlarged plan view of a part of the steering ratio changing mechanism of FIG. 2, FIG. 9 is a view schematically showing the control circuit for controlling the rear wheel steering ratio according to the vehicle speed, and FIG. 10 is a fragmentary cross-sectional view showing another example of the steering wheel turning angle sensor.

DESCRIPTION OF THE PREFERRED EMBODIMENT

Figure 6:
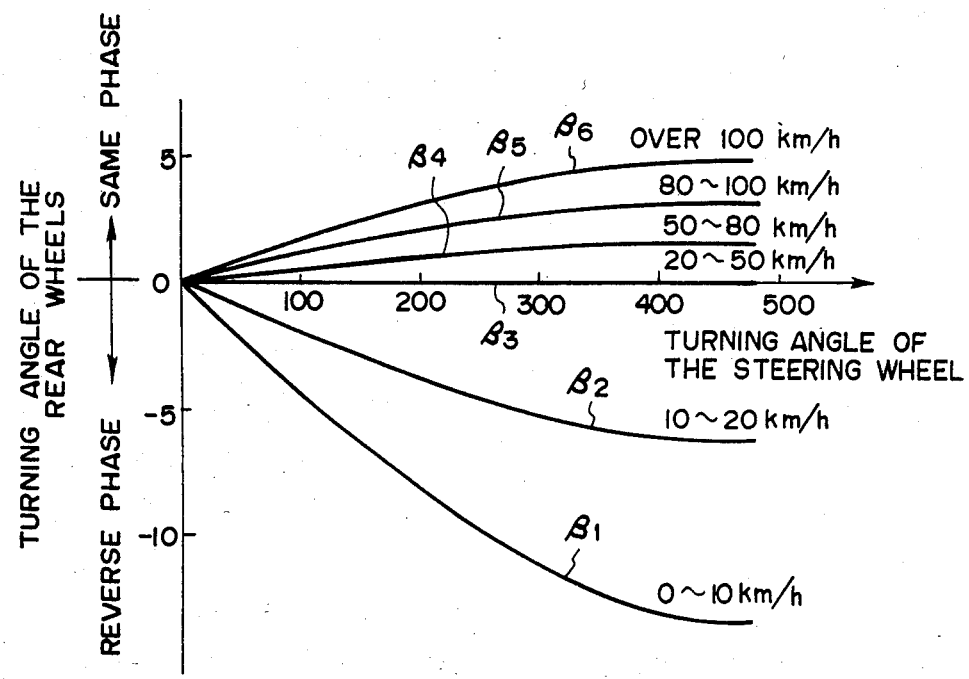
FIG. 6 is a view for illustrating an example of control to be made on the rear wheel steering ratio.

In FIG. 1, reference numerals 1R and 1L respectively denote right and left front wheels connected to a front wheel turning mechanism A, and reference numerals 2R and 2L respectively denote right and left rear wheels connected to a rear wheel turning mechanism B.

In the illustrated embodiment, the front wheel turning mechanism A comprises right and left knuckle arms 3R and 3L, right and left tie rods 4R and 4L, and a relay rod 5 connecting the tie rods 4R and 4L with each other. The front wheel turning mechanism A is associated with a steering mechanism C which is of a rack-and-pinion type in this particular embodiment. That is, a rack 6 is formed on the relay rod 5 and is in mesh with a pinion 7 which is fixed to a shaft 8 to be rotated in response to turning movement of a steering wheel 9. When the steering wheel 9 is turned right, the relay rod 5 is moved left in FIG. 1 to clockwisely rotate the right and left knuckle arms 3R and 3L about their respective pivotal centers 3R' and 3L', thereby turning the front wheels 1R and 1L in the clockwise direction by an amount corresponding to the turning angle of the steering wheel 9. When the steering wheel 9 is turned left, the front wheels 1R and 1L are turned in the counterclockwise direction by an amount corresponding to the turning angle of the steering wheel in a similar manner.

The rear wheel turning mechanism B comprises right and left knuckle arms 10R and 10L, right and left tie rods 11R and 11L, and a relay rod 12 connecting the tie rods 11R and 11L with each other, and is provided with a power steering mechanism D. That is, a cylinder device 13 is mounted on the relay rod 12 and a piston 13d is formed on the relay rod 12 integrally therewith. The piston 13d is inserted into a cylinder 13a to divide the internal space thereof into a pair of compartments 13b and 13c. The compartments 13b and 13c are connected to a control valve 16 by way of pipes 14 and 15, respectively. The control valve 16 is connected to a reservoir 17 by way of pipes 18 and 19. The pipe 18 which forms an oil feed line is provided with an oil pump 20 which is driven by the engine of the vehicle (not shown). In this embodiment, a booster valve type control valve having a sliding type control rod 21 is employed as the control valve 16. The control rod 21 has an input portion 21a which acts also as a movable member (an output rod) of a steering ratio changing mechanism E to be described hereinbelow, and an output portion 21b formed integrally with the relay rod 12 of the rear wheel turning mechanism B.

When the control rod 21 is moved leftward in FIG. 1, the relay rod 12 is moved in the same direction to clockwisely rotate the right and left knuckle arms 10R and 10L about their respective pivotal centers 10R' and 10L' to turn the rear wheels 2R and 2L right. When the rear wheels 2R and 2L are turned right, oil pressure is fed to the compartment 13c of the cylinder 13a according to the amount of movement of the control rod 21 to multiply the force acting to move the relay rod 12. When the control rod 21 is moved rightward, the rear wheels 2R and 2L are turned left with the force acting to move the relay rod 12 being multiplied by the oil pressure fed to the compartment 13b or the cylinder 13a. Reference numerals 13e and 13f respectively denote return springs for urging the relay rod 12 toward the neutral position.

Said front wheel turning mechanism A is also provided with a power steering mechanism F. That is, a cylinder device 65 is mounted on the relay rod 5 of the front wheel turning mechanism A and a piston 65d is formed on the relay rod 5 integrally therewith. The piston 65d divides the internal space of a cylinder 65a fixed to the vehicle body into a pair of compartments 65b and 65c. The compartments 65b and 65c are connected, respectively, by way of pipes 66 and 67, to a rotary type control valve 68 mounted on the shaft 8 of the steering mechanism C. To the control valve 68 are connected a pipe 70 extending from a shunting valve 69 provided in the pipe 18 on the discharge side of the oil pump 20, and a pipe 71 extending from the pipe 19. The power steering mechanism of this arrangement is well known and accordingly will not be described in more detail, here. Reference numeral 64 in FIG. 1 denotes a battery.

The rear wheel turning mechanism B is connected with the steering mechanism C by way of the front wheel turning mechanism A and a steering ratio changing mechanism E. An input rod 22 extends forward from the steering ratio changing mechanism E and a pinion 23 is mounted on the front end of the input rod 22 and is in mesh with a rack 24 formed on the relay rod 5 of the front wheel turning mechanism A. As described above, the input portion 21a of the control rod 21 of the control valve 16 acts also as the output rod of the steering ratio changing mechanism E.

FIGS. 2 to 5 show an example of the steering ratio changing mechanism E. Said input portion 21a of the control 21 is supported for sliding movement in the transverse direction of the vehicle body G along line l1 in FIG. 2. The steering ratio changing mechanism E includes a pivoted member 29 the upper end of which is connected for pivotal movement to a holder 30 by a pin 31. The holder 30 is supported on the vehicle body G so that the rotary shaft 30a thereof is rotatable about a line l2 perpendicular to the line l1 along which said input portion 21a is movable. The pin 31 extends through the intersection of the lines l1 and l2 and is perpendicular to the line l2.

As clearly shown in FIG. 3, the holder 30 is bifurcated and the pin 31 extends between the arms of the bifurcated portion. The upper end of the pivoted member 29 is mounted for pivotal movement on the pin 31 by way of a pair of angular bearings 32. The pivoted member 29 is prevented from being drawn away from the bearings 32 by a hub 33 which is retained in place by a lock nut 34. The pin 31 is prevented from being drawn away from the holder 30 by a hub 35 and a retainer ring 36, the hub 35 being retained in place by a lock nut 37. As can be understood from the description above, the pivoted member 29 is swingable about the pin 31, and the inclination of the swinging plane of the pivoted member 29 (that is, the plane along which the pivoted member 29 is swingable) with respect to a plane perpendicular to the line l1 (this plane forming the aforesaid reference plane in this embodiment) can be changed by rotating the holder 30.

The lower end portion of the pivoted member 29 is connected to the input portion 21a by way of a connecting member 38 which comprises a rod 39, and an arm portion 40, and having no pivotal junction, it has high rigidity in the longitudinal direction thereof. The rod 39 screws into the arm portion 40 through a lock nut 41 so that the overall length of the connecting member 38 is adjustable. The rod 39 is connected to the pivoted member 29 by way of a ball joint 42 and the arm portion 40 is connected to the input portion 21a by way of a pivotal joint 43 which is shown in FIG. 4. As shown in FIG. 4, the arm portion 40 is connected to the input portion 21a for pivotal movement by way of a pair of angular bearings 44. The arm portion 40 is prevented from being drawn away from the bearings 44 by a nut 45 and a lock nut 46. The bearings 44 are prevented from being drawn away from the input portion 21a by a hub 47 and a lock nut 48. Though the arm portion 40 is bent at the end portion adjacent to the input portion 21a in order to prevent interference therewith, the pivotal joint 43 connecting the arm portion 40 with the input portion 21a is positioned on the extension of the rod 39 which is straight.

The distance between the pivotal joint 43 and the ball joint 42 which is at an off-centered portion of the pivoted member 29 with respect to the pivotal center thereof, that is, which is positioned to be separated from the pivotal center of the pivoted member 29, is kept constant by the connecting member 35. Therefore, when the ball joint 42 is moved right/left in FIG. 2, the input portion 21a is moved right/left in response to the movement of the ball joint 42.

Swinging movement of the pivoted member 29 about the pin 31 is made according to the turning angle of the steering wheel 9. For this purpose, a swinging arm member 49 is provided to act on the rod 39 of the connecting member 38. The swinging arm member 49 comprises a body portion 50 and a tip portion 51 slidably fitting into the body portion 50. The swinging arm member 49 is supported for pivotal movement on the vehicle body F by a rotary shaft 49a formed on the upper end portion of the body portion 50 so that the rotary shaft 49a extends along the line l1 along which the input portion 21a is slidable. The tip portion 51 is slidable on the body portion 50 in the direction perpendicular to the rotary shaft 49a and is connected to the rod 39 of the connecting member 38 for pivotal movement by way of a ball joint 52. A bevel gear 53 is fixed to the rotary shaft 49a of the swinging arm member 49 and is in mesh with a bevel gear 54 fixed to the rear end of an input rod 22 to be described later. Thus, the swinging arm member 49 swings the pivoted member 29 about the pin 31 by an amount corresponding to the turning angle of the steering wheel 9. Though the input portion 21a is slid along the line 11 in response to the pivotal movement of the pivoted member 29 by way of the connecting member 38, the amount of the sliding movement of the input portion 21a for a given amount of pivotal movement of the pivoted member 29 varies depending upon the inclination of the swinging plane of the pivoted member 29 with respect to the reference plane, i.e., a plane perpendicular to the line 11. That is, the amount of the sliding movement of the input portion 21a for a given amount of pivotal movement of the pivoted member 29 can be changed by rotating the holder 30. Since the connecting member 38 in this embodiment has no pivotal junction such as one employing a ball joint or pin, the movement of the ball joint 42 is smoothly transmitted to the input portion 21a even if the connecting member 38 is inclined with respect to the line 11 along which the input portion 21a is slidable, whereby the steering rigidity is increased.

The means for changing the angle $\alpha$ of inclination of the swinging plane of the pivoted member 29 comprises, in this embodiment, a worm wheel 55 in the form of a sector gear fixedly mounted on the rotary shaft 30a of the holder 30, and a worm gear 56 which is in mesh with the worm wheel 51 and is driven by an actuator 57 such as a solenoid or an electric motor. (See FIG. 5.) The angular position of the holder 30 or the inclination of the swinging plane of the pivoted member 29 is detected by a steering ratio detecting sensor 58 which may comprise a potentiometer, for instance.

Figure 7:
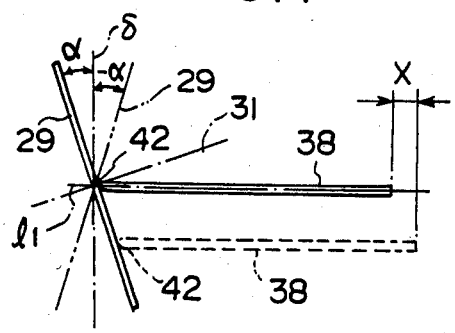
FIGS. 7 and 8 are views for illustrating the relation among the swinging angle of the pivoted member, the inclination of the swinging plane of the pivoted member and the amount of the sliding movement of the movable member.
Figure 8:
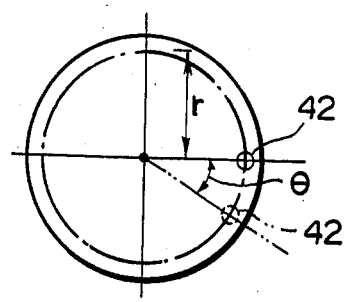

The relation among the swinging angle of the pivoted member 29 (the angle by which the pivoted member 29 is swung about the pin 31), the angular position of the pin 31 or the holder 30 (the inclination of the swinging plane of the pivoted member 29) and the amount of sliding movement of the input portion 21a or the ball joint 42 will be described with reference to FIGS. 7 and 8 in which the components such as the pivoted member 29 and the connecting member 38 are schematically shown. In FIGS. 7 and 8, when the swinging angle of the pivoted member 29 about the pin 31 is represented by $\theta$, the reference plane perpendicular to the line 11 is represented by $\delta$, the angle of inclination of the swinging plane of the pivoted member 29 with respect to the reference plane $\delta$ is represented by $\alpha$, and the distance between the ball joint 42 and the pin 31 or the distance by which the ball joint 42 is deviated from the pivotal center of the pivoted member 29 is represented by r, the amount of movement X of the ball joint 42 in the direction of the line 11 is a function of $\alpha$ and $\theta$ and is represented by the formula $X = r \cdot \tan\alpha \cdot \sin\theta$. Accordingly, when the angle $\alpha$ of inclination of the swinging plane of the pivoted member 29 is fixed, the amount of movement X of the ball joint 42 solely depends upon the swinging angle $\alpha$ of the pivoted member 29 or the turning angle of the steering wheel 9. On the other hand when the angle $\alpha$ is changed, the amount of movement X for a given turning angle of the steering wheel 9 is changed. In other words, the rear wheel steering ratio can be changed by changing the angle $\alpha$ of inclination of the swinging plane of the pivoted member 29 with respect to the reference plane $\delta$.

FIG. 6 shows an example of control to be made on the rear wheel steering ratio. In the example shown in FIG. 6, the rear wheel steering ratio characteristics are changed in six steps according to the vehicle speed. In the six rear wheel steering ratio characteristic curves $\beta 1$ to $\beta 6$, the characteristic curves $\beta 1$ and $\beta 2$ represent so-called reverse phase rear wheel steering characteristics in which the rear wheels 2R and 2L are turned in the direction opposite to the front wheels 1R and 1L, and the characteristic curves $\beta 4$ to $\beta 6$ represent so-called same phase rear wheel steering characteristics in which the rear wheels 2R and 2L are turned in the same direction as the front wheels 1R and 1L. If it is assumed that the angle $\alpha$ of inclination of the swinging plane of the pivoted member 29 has a positive value in the case of the same phase rear wheel steering characteristics, it is given a negative value in the case of the reverse phase rear wheel steering characteristics.

The characteristic curve $\beta 3$ represents the case in which the rear wheels are not turned irrespective of operation of the steering wheel.

FIG. 9 shows an example of a control means 81 for changing the rear wheel steering ratio according to the vehicle speed. The control means 81 comprises a rear wheel steering ratio calculating circuit 83 which receives the output of a vehicle speed sensor 82, a driving circuit 84 for driving the actuator 57 and a driving control circuit 85 for controlling the driving circuit 84. The rear wheel steering ratio calculating circuit 83 selects one of the rear wheel steering ratio characteristic curves $\beta 1$ to $\beta 6$ in FIG. 6 according to the vehicle speed signal from the vehicle speed sensor 82, and an output signal corresponding to the selected characteristic curve is input into the driving circuit 84 provided that a predetermined condition (to be described later) is satisfied. The output signal of the steering ratio detecting sensor 58 is input into the driving control circuit 85 to effect feedback control of the rear wheel steering ratio.

The control means 81 further comprises first and second AND circuits 86 and 87, a NOR circuit 88, inverter 89 and a timer circuit 90 including a capacitor C1 and a resistor R1. When the first AND circuit 86 outputs a high signal, the driving circuit 84 rotates the actuator 57 (electric motor) in one direction, while when the second AND circuit 87 outputs a high signal, the driving circuit 84 rotates the actuator 57 in the other direction. A regular rotation signal or a reverse rotation signal is input into the first or second AND circuit 86 or 87 as a high signal.

Into the NOR circuit 88 is input the output signal of a steering wheel turning angle sensor 91 (see also FIG. 1), and the output of the NOR circuit 88 is input into the inverter 89 via the timer circuit 90. The output of the inverter 89 is input into the first and second AND circuits 86 and 87, and the NOR circuit 88. The steering wheel turning angle sensor 91 outputs a high signal when the steering wheel 9 is in its neutral position, or the steering wheel turning angle is zero.

Also, the inverter 89 outputs a high signal when the steering turning angle is zero, and the actuator 57 makes rotation in the regular direction or in the reverse direction under the control of the signal from the driving control circuit 85 to change the angle of inclination of the swinging plane of the pivoted member 29, thereby changing the rear wheel steering ratio. During a time interval T which is determined by the capacitor C1 and the resistor R1 of the timer circuit 90 ($T = C1 \times R1$), the output signal from the inverter 89 is kept high to permit change of the rear wheel steering ratio even if the output signal from the steering wheel turning angle sensor 91 turns low. Often the steering wheel is slightly turned and soon is returned to the neutral position. In such a time, the steering wheel 9 may be considered to be in the neutral position, and accordingly said time interval T is determined taking into account the time interval required to slightly turn the steering wheel 9. Further, the steering wheel is seldom held in the neutral position for a long time and is generally kept turned right or left. Taking into account this fact in addition to the fact that it takes a certain time interval to actually change the rear wheel steering ratio by driving the actuator 57, it is necessary to ensure a time interval sufficient to complete change of the rear wheel steering ratio. This is the reason why the timer circuit 90 is employed in the circuitry of FIG. 9. Instead of employing such a timer circuit, the problem can be overcome by widening the range of the steering wheel turning angle within which the steering wheel turning angle is considered to be zero.

After a lapse of the time interval T set by the timer circuit 90, the output signal from the inverter 89 is kept low so long as the steering wheel is turned right or left from the neutral position so that the actuator 57 (electric motor) is held at the angular position at that time not to change the rear wheel steering ratio irrespective of the output signal from the driving control circuit 85.

FIG. 10 shows another example of the steering wheel turning angle sensor in which the steering wheel turning angle is detected through the angular position of the swinging arm member 49. In FIG. 10, a slit plate 92 is fixed to the rotary shaft 49a of the swinging arm member 49 and a steering wheel turning angle sensor 91' is positioned opposed to the slit plate 92. This arrangement is advantageous in that the steering wheel turning angle actually input into the steering ratio changing mechanism E can be detected more precisely without being affected by play in the system between the steering wheel 9 and the swinging arm member 49, whereby the rear wheel steering ratio can be controlled more precisely.

When a step-motor is used as the actuator 57, the angle α of inclination of the swinging plane of the pivoted member 29 can be finely controlled since the step-motor can be rotated by a small angle and accordingly the rear wheel steering ratio can be controlled substantially continuously. Further the step motor is advantageous in that holding current for holding the rear wheel steering ratio at a desired value is not necessary and electric power consumption can be reduced. Further, when a DC motor is used as the actuator 57, the overall size of the system can be reduced, and the reliability of the system can be maintained against change in temperature, vibration, voltage drop and the like. Especially, when a DC servomotor is used, the rear wheel steering ratio can be finely controlled, in addition. Further, use of the worm wheel 55 and the worm gear 56 is advantageous in accomplishing fine control of the angle α of inclination of the swinging plane of the pivoted member 29, and is advantageous in that external forces such as kickback from the rear wheels 2R and 2L can be absorbed by the worm gear 56, whereby the holder 30 or the pivoted member 29 can be positively held in a desired angular position.

Though in the above embodiments the rear wheel steering ratio is changed according to the vehicle speed, the rear wheel steering ratio may be changed according to the lateral acceleration acting on the vehicle body, for example, or according to the driver's chosing as effected by his manual operation, may be changed according to a combination of a plurality of factors such as vehicle speed and lateral acceleration. The front wheel turning mechanism A and the rear wheel turning mechanism B need not be provided with the power steering system. Further, though in the above embodiments, the steering ratio changing mechanism E is connected to the steering mechanism C by way of the front wheel turning mechanism A, it may be directly connected to the steering mechanism C. Said reference plane need not be limited to a plane perpendicular to the line 11 and other suitable planes may be used instead as the reference plane.

We claim:

1. A four-wheel steering system for a vehicle comprising a steering mechanism including a steering wheel, a front wheel turning mechanism operatively connected to the steering mechanism to turn the front wheels according to the turning angle of the steering wheel, a rear wheel turning mechanism operatively connected to the steering mechanism to turn the rear wheels in response to operation of the steering wheel, a vehicle speed sensor for detecting the vehicle speed and outputting a vehicle speed signal, a rear wheel steering ratio changing means for changing the ratio of the turning angle of the rear wheels to the turning angle of the steering wheel according to a control signal input thereinto, and a control signal generating means which receives the vehicle speed signal from the vehicle speed sensor and inputs said control signal into the rear wheel steering ratio changing means to change the ratio of the turning angle of the rear wheels to the turning angle of the steering wheel according to the vehicle speed, characterized by having a steering wheel turning angle sensor which detects the turning angle of the steering wheel and outputs a steering wheel turning angle signal, and an inhibiting means which receives the steering wheel turning angle signal and inhibits the rear wheel steering ratio changing means from changing the ratio of the turning angle of the rear wheels to the turning angle of the steering wheel when the steering wheel is turned right or left from its neutral position.

2. A four-wheel steering system as defined in claim 1 in which said inhibiting means inhibits the control signal from being input into the rear wheel steering ratio changing means.

3. A four-wheel steering system as defined in claim 2 in which said rear wheel steering ratio changing means changes the ratio of the turning angle of the rear wheels so that the rear wheels are turned in the same direction as the front wheels when the vehicle speed is high and are turned in the reverse direction to the front wheels when the vehicle speed is low.

4. A four-wheel steering system as defined in claim 3 in which said rear wheel steering ratio changing means includes an electric motor which can be rotated in both the regular and reverse directions.

5. A four-wheel steering system as defined in claim 4 in which said control signal generating means generates a regular rotation control signal for rotating the electric motor in the regular direction and a reverse rotation control signal for rotating the electric motor in the reverse direction.

6. A four-wheel steering system as defined in claim 5 in which said control signal generating means has a rear wheel steering ratio characteristic generating means which generates rear wheel steering ratio characteristics predetermined according to the vehicle speed, the steering ratio characteristics representing the ratio of the turning angle of the rear wheels to the turning angle of the steering wheel according to the vehicle speed.

7. A four-wheel steering system as defined in claim 6 in which said rear wheel steering ratio characteristics are arranged so that when the vehicle speed is high, the rear wheels are turned in the same direction as the front wheels with the ratio of the turning angle of the rear wheels to the turning angle of the steering wheel being increased as the vehicle speed increases and when the vehicle speed is low, the rear wheels are turned in the reverse direction to the front wheels with the ratio of the turning angle of the rear wheels to the turning angle of the steering wheel being increased as the vehicle speed is reduced.

8. A four-wheel steering system as defined in claim 6 in which said control signal generating means further comprises a motor angular position detecting means which detects the angular position of the electric motor and generates a motor angular position signal and feedback control is effected to obtain the angular position of the electric motor corresponding to the turning angle of the rear wheels given by the rear wheel steering ratio characteristics generated by the rear wheel steering ratio characteristic generating means.

9. A four-wheel steering system as defined in claim 8 in which said rear wheel steering ratio changing means comprises a pivoted member which is adapted to be swung by a swinging member, the swinging plane of the pivoted member along which the pivoted member is swingable being adapted to be inclined with respect to a predetermined reference plane, the swinging member being adapted to swing the pivoted member by way of steering operating force, inclination changing means for changing the angle of inclination of the pivoted member with respect to the reference plane, and connecting means which connects an off-centered portion of the pivoted member positioned in deviation from the pivotal center of the pivoted member with said rear wheel turning mechanism, whereby the turning angle of the rear wheels is controlled according to the amount of movement of the off-centered portion of the pivoted member which is determined by the swinging angle of the pivoted member through which the pivoted member is swung by the swinging member in response to operation of the steering wheel and by the angle of inclination of the pivoted member with respect to the reference plane.

10. A four-wheel steering system as defined in claim 9 in which said steering wheel turning angle sensor detects the turning angle of the steering wheel through the angular position of said swinging member.

11. A four-wheel steering system as defined in claim 3 in which said inhibiting means comprises an AND circuit into which said control signal and said steering wheel turning angle signal are input.

12. A four-wheel steering system as defined in claim 11 in which said inhibiting means further comprises a determination means which determines that the steering wheel is in its neutral position irrespective of the actual position of the steering wheel during a predetermined time interval after the steering wheel is brought into the neutral position from a position of deviation from the neutral position.

13. A four-wheel steering system as defined in claim 12 in which said determination means comprises a timer circuit into which the steering wheel turning angle signal is input.

14. A four-wheel steering system as defined in claim 13 in which said timer circuit includes a capacitor and a resistor.

15. A four-wheel steering system as defined in claim 13 in which said control signal generating means comprises an electric control circuit.

16. A four-wheel steering system as defined in claim 15 in which said inhibiting means is integrally included in the electric control circuit.

17. A four-wheel steering system as defined in claim 16 in which said inhibiting means comprises an AND circuit.

* * * * *